United States Patent
Wyseur

(10) Patent No.: US 11,526,616 B1
(45) Date of Patent: Dec. 13, 2022

(54) METHOD TO VERIFY THE EXECUTION INTEGRITY OF AN APPLICATION IN A TARGET DEVICE

(71) Applicant: NAGRAVISION S.A., Cheseaux-sur-Lausanne (CH)

(72) Inventor: Brecht Wyseur, Echallens (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

(21) Appl. No.: 17/099,814

(22) Filed: Nov. 17, 2020

Related U.S. Application Data

(63) Continuation of application No. 15/774,673, filed as application No. PCT/EP2016/077932 on Nov. 17, 2016, now Pat. No. 10,846,409.

(30) Foreign Application Priority Data

Nov. 19, 2015 (EP) ..................................... 15195379

(51) Int. Cl.
*G06F 21/57* (2013.01)
*G06F 21/44* (2013.01)
(Continued)

(52) U.S. Cl.
CPC ............ *G06F 21/577* (2013.01); *G06F 21/44* (2013.01); *G06F 21/51* (2013.01); *G06F 21/52* (2013.01);
(Continued)

(58) Field of Classification Search
CPC ........ G06F 21/577; G06F 21/44; G06F 21/51; G06F 21/52; G06F 21/53; G06F 21/54; G06F 21/57; G06F 21/64
See application file for complete search history.

(56) References Cited

U.S. PATENT DOCUMENTS 8,171,295 B2 * 5/2012 Munetoh ................. G06F 21/57
713/176
8,579,705 B1  11/2013 Bond
(Continued)

FOREIGN PATENT DOCUMENTS

EP 2282474 A1 2/2001

OTHER PUBLICATIONS

Juan A Garay et al: "Software Integrity Protecting Using Timed Executable Agents", Proceedings of the 2006 ACM Symposium on Information, Computerand Communications Security, ASIACCS 2006,Mar. 21, 2006 (Mar. 21, 2006), XP055271649 (13 pages).
(Continued)

*Primary Examiner* — Thaddeus J Plecha
(74) *Attorney, Agent, or Firm* — Hoyng Rokh Monegier BV; David P. Owen

(57) ABSTRACT

The present invention concerns the field of software verification, in particular to check whether the run-time integrity of a software application can be demonstrated. It is therefore proposed a method to verify, by a verification server, the execution integrity of an application in a target device wherein the verification server receives an application signature generated from run time application information on the target device, said signature being used to verify the execution integrity of the application in the target device, said application comprising an array of blocks, each block producing a digest, thus producing an array of digests related to the array of blocks, comprising the steps of: —sending to the target device a message comprising a challenge and a first function, said first function defining an aggregation method, said challenge defining an aggregation instruction, —receiving an attestation from the target device, this attestation being generated by the target device by determining for each block, the corresponding digest for said block,
(Continued)

aggregating the digests of the blocks according to the aggregation method of the first function and the challenge to produce the attestation related to the application, —applying a second function to the attestation by the verification server, said second function undoing the effect of the challenge thus producing an application signature independent of the challenge, —verifying the execution integrity of the application by comparing the produced application signature with a reference signature.

19 Claims, 2 Drawing Sheets

(51) Int. Cl.
    *G06F 21/54* (2013.01)
    *G06F 21/51* (2013.01)
    *G06F 21/53* (2013.01)
    *G06F 21/52* (2013.01)

(52) U.S. Cl.
    CPC ............. *G06F 21/53* (2013.01); *G06F 21/54* (2013.01); *G06F 21/57* (2013.01)

(56) References Cited

U.S. PATENT DOCUMENTS

| | | | |
|---|---|---|---|
| 8,688,991 B1* | 4/2014 | Sunil | H04N 21/812 |
| | | | 713/176 |
| 2005/0066169 A1 | 3/2005 | Kiehtreiber | |
| 2005/0132031 A1 | 6/2005 | Sailer et al. | |
| 2008/0235372 A1 | 9/2008 | Sailer et al. | |
| 2009/0204818 A1 | 8/2009 | Shin | |
| 2009/0300348 A1* | 12/2009 | Aciicmez | H04L 63/08 |
| | | | 713/156 |
| 2010/0023760 A1* | 1/2010 | Lee | G06F 21/10 |
| | | | 713/168 |
| 2010/0235912 A1 | 9/2010 | Hermann | |
| 2011/0173643 A1 | 7/2011 | Nicolson et al. | |
| 2011/0258516 A1* | 10/2011 | Salmon-Legagneur | |
| | | | G06F 21/54 |
| | | | 714/768 |
| 2012/0324557 A1* | 12/2012 | Rubin | G06F 21/50 |
| | | | 726/7 |
| 2013/0111215 A1* | 5/2013 | Horne | G06F 21/52 |
| | | | 713/187 |
| 2015/0067855 A1 | 3/2015 | Lee | |
| 2017/0068955 A1* | 3/2017 | Agarwal | G06Q 20/3829 |
| 2018/0204005 A1* | 7/2018 | Gajek | H04L 9/3218 |

OTHER PUBLICATIONS

Xin Huang et al: "An Effective Approach for Remote Attestation in Trusted Computing", Proceedings. The 2009 International Symposium on Web Information Systems and Applications (WISA2009), May 22, 2009 (May 22, 2009), pp. 80-83, XP055271456.

Cataldo Basile et al, "FPGA-Based Remote-Code Integrity Verification of Programs in Distributed Embedded Systems", IEEE transactions on systems, man & cybernetics, Part C, vol. 42, No. 2, Mar. 2012, pp. 187-200.

Mehari G. Msgna et al, "Secure Application Execution in Mobile Devices", Information Security Group, Smart Card Centre, University of London, UK. Springer-Verlag Berlin Heidelberg. Pya Ryan et al. Kahn Festschrift LNCS 9100, 2016, pp. 417-438.

* cited by examiner

METHOD TO VERIFY THE EXECUTION INTEGRITY OF AN APPLICATION IN A TARGET DEVICE

INTRODUCTION

The present invention concerns the field of software verification, in particular to check whether the run-time integrity of a software application can be demonstrated.

BACKGROUND ART

Remote attestation is a method to detect changes to the user's computer (or any software embedded in a device) by authorized parties. For example, trusted centers can identify unauthorized changes to software, including users tampering with their software to circumvent technological protection measures. The target device generates a certificate (an attestation) making an expression on the execution of software and/or the execution platform. The target device can then present this certificate to a remote party to show that unaltered software is currently executing.

Remote attestation may be combined with public-key encryption so that the information sent can only be read by the programs that presented and requested the attestation, and not by an unauthorized third party.

The verification method is based on the transmission, by a verification center, of a challenge to the target device. This challenge is used by the software to produce a result, this result being dependent of the software code and execution-time information and the challenge. The result is then transmitted back to the verification center for verification.

The key to verify the result is a precise knowledge of the software of the target device so as to produce a reference result for comparison.

BRIEF DESCRIPTION OF THE INVENTION

It is an aspect of the present invention to propose a method and system to verify the software embedded in a target device. In the frame of the present description it is proposed a method to verify the execution integrity of an application in a target device by producing an application signature from run time application information, said signature being used to verify the execution integrity of the application by a verification server, said application comprising an array of blocks, each block producing a digest, thus producing an array of digests related to the array of blocks, comprising the steps of:
  receiving by the target device a message comprising a challenge and a first function, said first function defining an aggregation method, said challenge defining an aggregation instruction,
  determining for each block, the corresponding digest for said block,
  aggregating the digests of the blocks according to the aggregation method of the first function and the challenge to produce an attestation related to the application,
  sending the attestation to the verification server,
  applying a second function to the attestation by the verification server, said second function undoing the effect of the challenge thus producing an application signature independent of the challenge,
  verifying the execution integrity of the application by comparing the produced application signature with a reference signature.

BRIEF SUMMARY OF THE FIGURES

The following Detailed Description will be better understood thanks to the attached figures in which.

DETAILED DESCRIPTION

Attestation schemes are schemes where a run-time environment or application produces a proof of integrity (an attestation). Remote attestation schemes are challenge-response protocols, where an application is requested to compute such an attestation based on the challenge it received from a verification server. Based on the received response (the attestation), the verifier (a remote trusted entity such as a Head-End) is able to make a trustworthiness verdict on the integrity of the execution of that application. Usual attestation schemes compute such an attestation from run-time information such as memory content. There are for example schemes published where the challenge defines a predefined visit through memory; the attestation being the hash of the values encountered during this visit.

The known remote attestation schemes require that the run-time environment of the application is emulated or that at least the application (or part thereof) is available by the trusted entity, such that it can compute the expected result given the challenge and verify the correctness of the received attestation. This introduces significant complexity that in practice is very hard to deal with, because of, e.g., the diversity of application versions; and the number of application instances that needs to be verified.

According to the present specification, it is proposed an attestation scheme where the verdict computation is reduced to verifying if a tuple {version, appsign} exists in a given set, which heavily reduces the complexity of deployment in practice. This is achieved by delegating a part of the remote attestation scheme (i.e., the part that ensures that there is a proper challenge-response protocol) to a "Remote Attestation Frontend" (RAF). The solution is designed for the RAF to have no information on the application that needs to be verified; it only supports the challenge-response protocol, and extracts from the response an application signature (appsign) that the verification entity (VE) can use to make its trustworthiness verdict on the execution of the client application (App).

Figure 1:
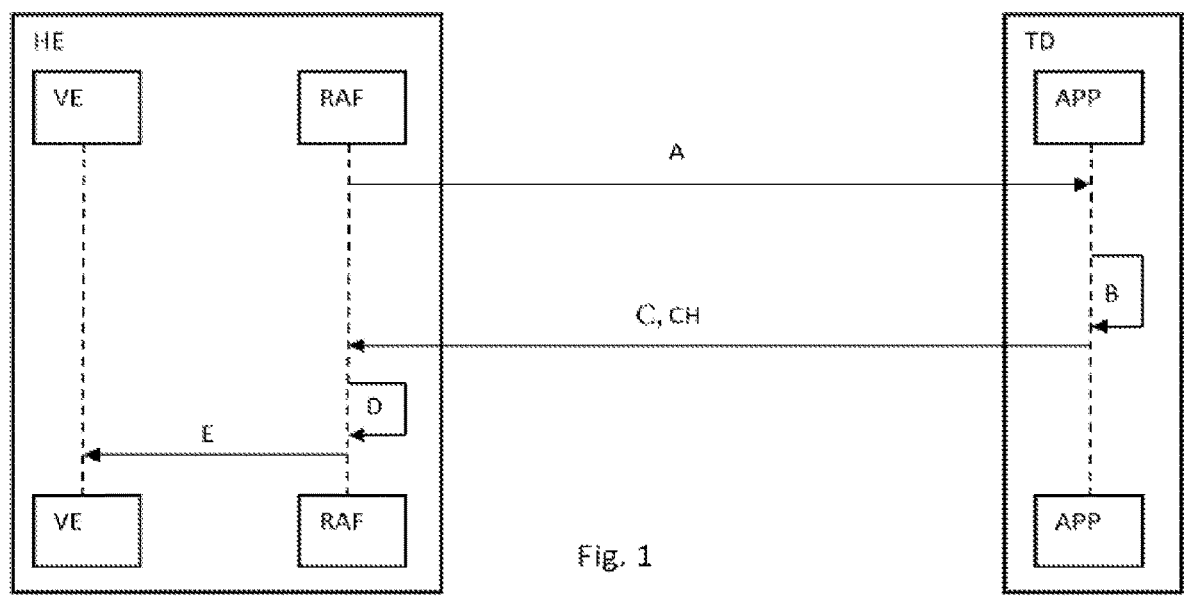
FIG. 1 illustrates the system comprising a head end and a target device as well as the steps to verify an application.

The high-level view of this solution is presented in FIG. 1. The head end HE comprises a Verification Entity VE and a Remote Attestation Frontend RAF. The Verification Entity VE requests the Remote Attestation Frontend RAF to perform a query to a target device TD. The Remote Attestation Frontend RAF prepares a challenge CH and sends it to the target device TD. It is to be noted that a target device can be any type of electronic device embedding a processing unit executing a program.

The step A is the transmission of the challenge to the target device. A challenge is a value unpredictable by the target device. It can be for example randomly generated by the Remote Attestation Frontend RAF. The transmission between the Remote Attestation Frontend RAF and the target device TD can be a bidirectional channel such as an Internet connection, or can be a broadcast connection in which the challenge CH is sent to a plurality of target devices TD.

Once the challenge is received, the generation of the attestation can start (step B). The target device TD comprises an attestation module AM in charge of producing the attestation. This attestation module AM can be a dedicated program of the target device or an independent processor connected to the main communication bus of the main processor. In this latter case, the independent processor has access to the memory storing the variables and can calculate the digest on these variables.

Attestation R=F (CH, APP), where F represents the function that computes the attestation based on the received challenge CH, and some (run-time) information of the Application (APP) such as the application memory space. Given the challenge CH and the response R, the RAF computes the app signature, which is a value that should only depend on the application information independent from the challenge.

Below, we present a concrete construction to achieve this. One skilled in the art will recognize that alternative constructions, variations, and extensions on this proposed construction are possible.

According to an embodiment, a set of vector of digests [h0, h1, . . . , hn] is built, which solely depend on (parts of) the application (run-time) information, and define the attestation as some function on this vector; the function being instantiated by the challenge and being invertible. Using this challenge, the RAF can compute the inverse function, such that from the attestation (response), he can reconstruct this vector of digests. The app signature is then the result of some function computed onto this vector of digests (or a part thereof).

Figure 2:
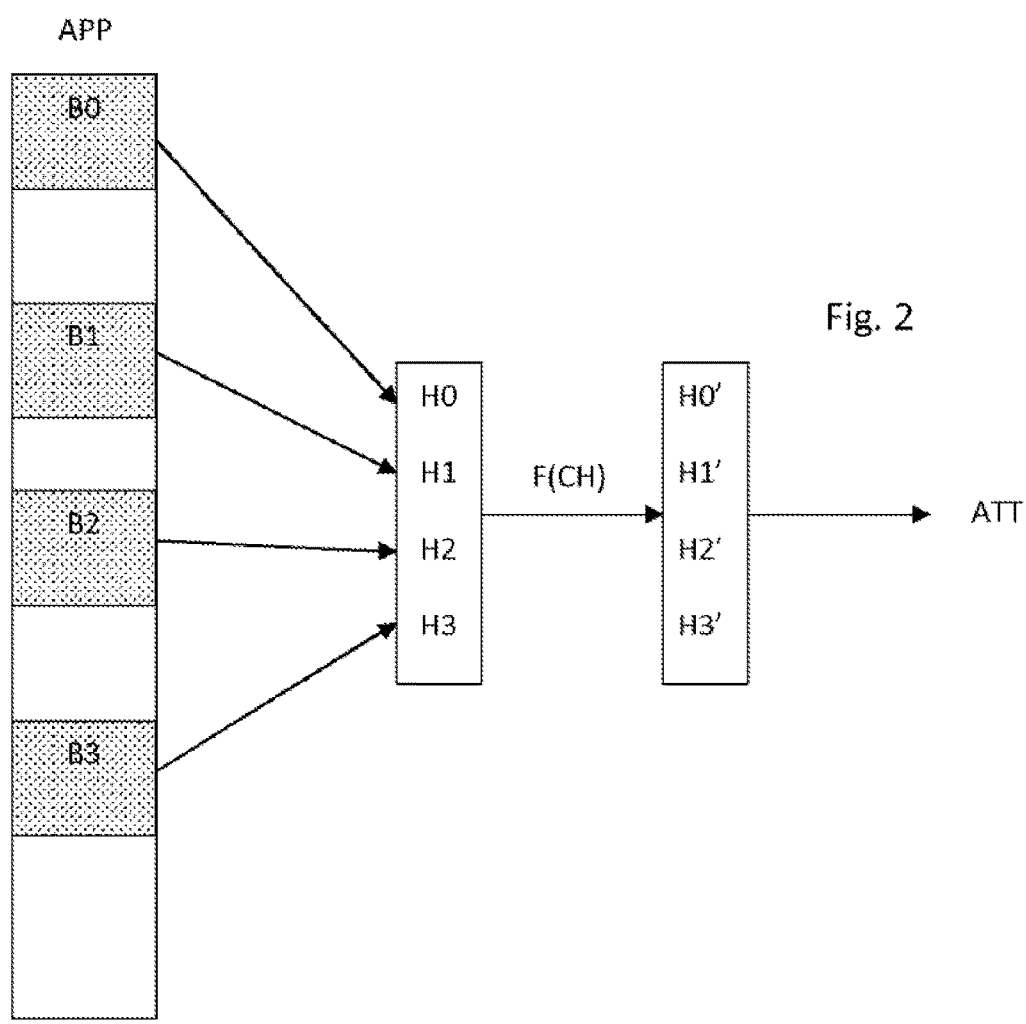
FIG. 2 illustrates the generation of the attestation.

The FIG. 2 explains in more detail the process of the attestation generation. The program to be verified is divided into blocks (B0 . . . B3), and the attestation module AM comprises a memory to store the map of the blocks taking part of the attestation generation. The attestation module generates for each block a digest H representing the block. This digest H can be calculated as follows:
 static: a hash value of the block, or any operation on the content of the memory block,
 dynamic: the content of run-time memories including for example registers, stack, heap content at the end of the execution of the block. In order to generate the same values in the run-time memories each time the block is executed, the run-time memories are set to predefined values before the execution.

Once the set of digests (H0, H1, . . . Hn) is obtained, the next step is the calculation of the attestation, this operation being dependent of the challenge. A function F(CH) is applied on the set of digests to produce the attestation (H0', H1' . . . Hn'). A large number of possibilities exist for the function F, the key factor is the possibility to have the inverse function $F^{-1}$ allowing to retrieve the set of digests.

Example of Function F

Shuffling function: the challenge CH is used as a parameter to shuffle each member of the set. The resulting set contains all digests, only the position into the set is randomly modified based on the challenge CH.

Mathematical operation: the resulting digest H' is the result of an operation of at least two digests. Example: H0'=H3×H6; H1'=H2×H5, or H0'=H3+H6; H1'=H0+H7. The selection of the digests participating to the operation is based on the challenge CH. Complex operations can be executed such as H0'=H3×H6+H7; H1'=H2/H4×H12 . . . .

Affine function: Affine functions represent vector-valued functions of the form of, for example H0'=A0.H0+ A1.H1+ . . . An. Hn in which the A0 to An coefficients are given by the challenge.

Examples of affine transformations include linear functions such as additions or multiplication with a constant (the constant could be the coefficient of the challenge).

The set of digests (H0 . . . Hn) can be expressed as a matrix of digests of x lines and y columns such as:

$$H = \begin{Bmatrix} H0 & H1 & H2 \\ H3 & H4 & H5 \\ H6 & H7 & H8 \end{Bmatrix}$$

the challenge can be also in the form of a matrix $$C = \begin{Bmatrix} C0 & C1 & C2 \\ C3 & C4 & C5 \\ C6 & C7 & C8 \end{Bmatrix}$$

And the resulting attestation H' may be a matrix such as H'=F(CH,H). Once the attestation H' is calculated by the attestation module of the target device, the result is sent to the Remote Attestation Frontend RAF together with an identifier of the application's version (VER).

Another example of the function F is an encryption function of the matrix of digests, the key used for that encryption could be the challenge or information derived from the challenge according to a derivation function known by the RAF and the target device.

The function used to determine the attestation can be a multivariate function that computes the attestation based on the challenge and the matrix of digests. This is preferably an invertible linear function. This can be defined unambiguously by generating an invertible function based on the challenge. The resulting matrix is then multiplied with the matrix of digests in order to obtain an attestation that is sent (as a matrix of the same length of the matrix of digests) to the RAF.

The RAF can use the same algorithm to compute the same matrix from the challenge CH that it persisted, and then compute its inverse matrix. This applies on the response producing the original matrix of digests, which is then in turn used to compute the app signature.

Figure 3:
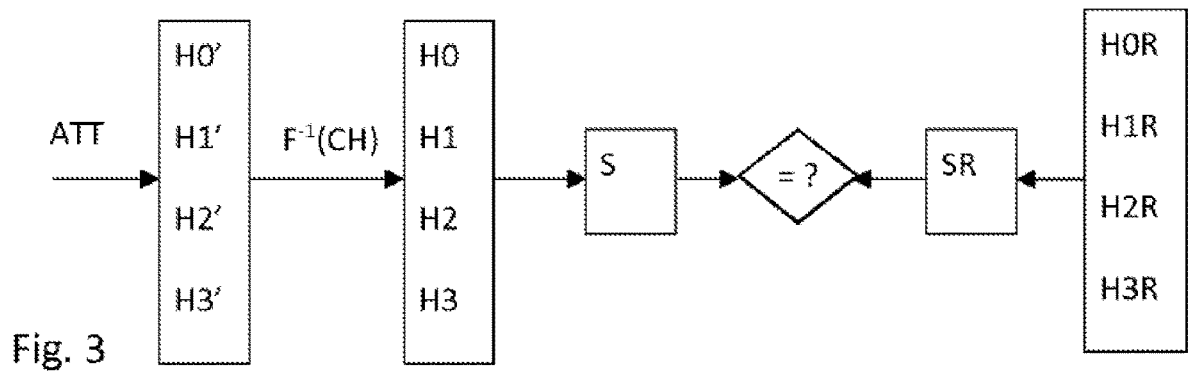
FIG. 3 illustrates the verification of the attestation.

On the FIG. 3, the operations executed by the RAF are illustrated. The attestation ATT is received (step C, FIG. 1) together with the identifier of the application (VER). The attestation ATT comprises a set of values (H0', H1' . . . Hn') which is unique per challenge. The RAF, as the generator of the challenge C, can use it with the inverse function $F^{-1}$ on the attestation ATT (step D, FIG. 1). This will produce the set of calculated digests H0, H1 . . . Hn.

According to an embodiment, a signature S is generated from the calculated digests, for example by mixing the digests to produce a single value S. The mixing function can be a hash function on the digests. This signature S is sent to the Verification Entity VE for verification.

The Verification Entity VE comprises data storage to store a pair of reference data, said pair comprising at least the reference signature SR and the version of the application. Once the pair if the current signature S and the current version V is received (step E) by the Verification Entity, the version V of the received pair is used to retrieve the reference signature SR from the data storage.

During a previous initialization step, the Verification Entity VE has generated the set of reference digests (H0R, H1R ... HnR) and produced the reference signature SR, the set of reference digests being produced on a reference client device.

A comparison is carried out between the current signature S and the reference signature SR and the result of the verification allows determining if the application of the target device is genuine. The Verification Entity can then inform a service provider which is in charge of delivering content to the target device or send a validation message to the target device.

According to an embodiment, the step of producing the attestation from the set of digests can be combined with the operation that computes the digests. For example, when the attestation generation function is a multivariate function, and the function to compute the digests from the block (the sub-digests) is a multivariate function too, these can be combined. The block B0 of the application APP is divided into a plurality of sub-digests B0a, B0b ... B0n. The function F then defines the operations, parameterized with the challenge C, on the sub-digests. Example:

If $H0=B0a+B0b$ and $H1=B1a\times B1b$ define how the digests can be computed from the sub-digests and $H0'=C0\times H0\times H1+C1\times H1$ and $H1'=C0\times H1+C1\times H0$, then $H0'$ and $H1'$ can be computed directly by a definition F that depends on the inputs CH and the sub-digests as follows:

$$H0'=C0\times(B0a+B0b)\times(B1a\times B1b)+C1\times B1a\times B1b$$

$$H1'=C0\times B1a\times B1b+C1\times(B0a+B0b).$$

This computation can be represented as such that it becomes difficult to separate the 2 operations.

The multiplications and additions are given as an example. Any type of mathematical operations can be applied with two or more sub-digests. So the set of digests H0' ... Hn' is produced directly from the sub-digests of a plurality of blocks, generalizing the example above.

According to an embodiment, the attestation module of the target device has a definition of the blocks B0 ... Bn. This definition is stored in the memory of the attestation module of the target device or directly implemented into the attestation module software.

In another embodiment, the Verification Entity VE comprises in its data storage, a plurality of definitions with the corresponding set of reference signatures and the version of the application. A definition is to be understood as defining the blocks in the application taking part of the generation of the digests (this can be in the form of a set of memory range or a set of memory addresses) or defining the initialization parameters of the run-time execution of the block. For each set of initialization parameters and for a given version, a reference signature is stored in the database. The attestation module can then comprises several definitions of array of blocks stored in a memory table. The RAF include in the message sent to the target device the indication (table index) of which definition should be used for the determination of the attestation.

Example of the Definition Table

| Table Index | Block | Block | Block | Block | Block | Block |
|---|---|---|---|---|---|---|
| 1 | B3 | B5 | B12 | B2 | B1 | B9 |
| 2 | B0 | B4 | B10 | B2 | B7 | B21 |
| 3 | B4 | B8 | B2 | B11 | B17 | B10 |
| 4 | B1 | B3 | B6 | B5 | B13 | B16 |

Each block can be identified by a starting and ending address of the target software.

According to another example, the attestation module receives from the RAF the definition of the blocks taking part of the attestation.

Preferred examples of target devices are audio/video receivers and in particular the application which is responsible of the verification of the right to process said audio/video. However, the verification can take place in any device having software that needs verification, such as a smartphone or device used in critical environment (plant security for example).

Figure 4:
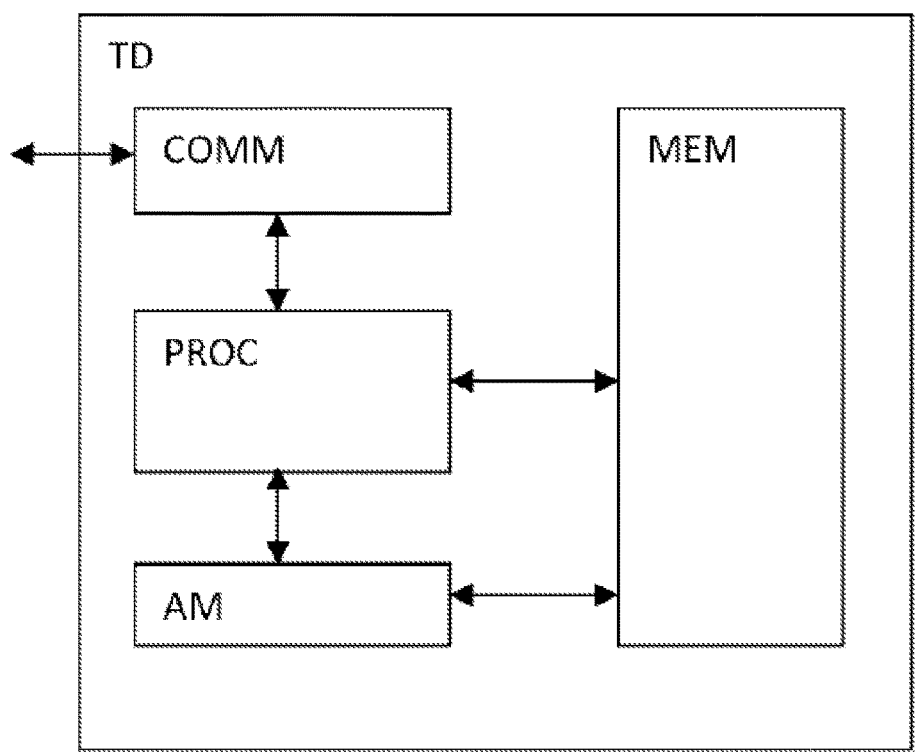
FIG. 4 illustrates the target device.

The FIG. 4 illustrates de target device. It comprises a communication module COMM to receive the challenge with the request to perform the generation of an attestation. This module is used also to send the attestation to the RAF. The target device TD comprises a processing unit PROC to execute the operations related to the generation of the attestation. Alternatively, the processing module can delegate the generation of the attestation to an attestation module AM. Both the processing unit and the attestation module have access to the memory from which attestation procedure can take place.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system to verify an execution integrity of an application in a target device, the system comprising:
   a verification entity;
   a remote attestation frontend;
   wherein the verification entity and the remote attestation frontend are remote from the target device and the remote attestation frontend is arranged to transmit a challenge to the target device and to receive a response from the target device based on the challenge and information of the application;

wherein the remote attestation frontend is arranged to extract from the response an application signature and an application version which the verification entity uses to verify the execution integrity of the application in the target device;

wherein the verification entity is arranged to verify the execution integrity of the application by verifying whether a tuple comprising the application version and the application signature exists in a pre-determined set.

2. The system according to claim 1, wherein the remote attestation frontend is arranged to have no information on the application in the target device.

3. The system according to claim 1, wherein the application signature is a value that only depends on the application independent from the challenge.

4. The system according to claim 1, wherein the challenge is a value unpredictable by the target device.

5. The system according to claim 1, wherein the transmission of the challenge from the remote attestation frontend to the target device is a bidirectional channel.

6. The system according to claim 1, wherein the transmission of the challenge from the remote attestation frontend to the target device is a broadcast connection.

7. The system according to claim 1, wherein the verification entity comprises data storage to store the pre-determined set;

wherein the pre-determined set comprises a pair of reference data, said pair comprising at least a reference signature and a corresponding version of the application.

8. The system according to claim 7, wherein the reference signature is produced using a reference device.

9. A method to verify an execution integrity of an application in a target device, the method comprising:

generating by a remote attestation frontend a challenge, the remote attestation frontend being remote from the target device;

transmitting by the remote attestation frontend the challenge to the target device;

receiving by the remote attestation frontend a response from the target device based on the challenge and information of the application;

extracting by the remote attestation frontend from the response an application signature and an application version which a verification entity uses to verify the execution integrity of the application in the target device;

verifying by the verification entity the execution integrity of the application by verifying whether a tuple comprising the application version and the application signature exists in a pre-determined set.

10. The method of claim 9, wherein the remote attestation frontend is arranged to have no information on the application in the target device.

11. The method according to claim 9, wherein the application signature is a value that only depends on the application independent from the challenge.

12. The method according to claim 9, wherein the challenge is a value unpredictable by the target device.

13. The method according to claim 9, wherein the transmitting of the challenge from the remote attestation frontend to the target device is done via a bidirectional channel or wherein the transmitting of the challenge from the remote attestation frontend to the target device is done via a broadcast connection.

14. The method according to claim 9, wherein the verification entity stores the pre-determined set in a data storage comprised in the verification entity;

wherein the pre-determined set comprises a pair of reference data, said pair comprising at least a reference signature and a corresponding version of the application.

15. The method according to claim 14, wherein the reference signature is produced using a reference device.

16. A device, comprising an application, which is arranged to operate within a remote attestation protocol to verify an execution integrity of the application by producing an attestation, further comprising an attestation module for producing the attestation;

wherein the attestation module is arranged to receive a challenge and to compute, using a function, the attestation based on the challenge and information of the application;

wherein the function is an invertible shuffling function, affine function or multivariate function and pre-determined in the remote attestation protocol;

wherein the attestation module is arranged to transmit the attestation.

17. The device according to claim 16, wherein the attestation module is a dedicated program of the device or an independent processor connected to a main communication bus of a main processor of the device.

18. The device according to claim 16, wherein the information of the application is the application's memory space.

19. The device according to claim 16, further comprising a communication module to receive the challenge and to transmit the attestation.

* * * * *